US010299139B1

(12) United States Patent
Konka et al.

(10) Patent No.: US 10,299,139 B1
(45) Date of Patent: May 21, 2019

(54) APPARATUS AND METHOD FOR STEERING WIRELESS NETWORK CONNECTIONS BASED UPON QUALITY ASSESSMENTS

(71) Applicant: Ipass Inc., Redwood City, CA (US)

(72) Inventors: Raghu Konka, Pleasanton, CA (US); Navtej Singh Mann, Fremont, CA (US); Purushottam Shukla, Belmont, CA (US); Blaz Vavpetic, Norwell, MA (US)

(73) Assignee: Ipass Inc., Redwood City, CA (US)

( * ) Notice: Subject to any disclaimer, the term of this patent is extended or adjusted under 35 U.S.C. 154(b) by 0 days.

(21) Appl. No.: 15/882,935

(22) Filed: Jan. 29, 2018

(51) Int. Cl.
*H04W 4/00* (2018.01)
*H04W 16/14* (2009.01)
*H04W 48/18* (2009.01)
*H04W 76/10* (2018.01)

(52) U.S. Cl.
CPC ........... *H04W 16/14* (2013.01); *H04W 48/18* (2013.01); *H04W 76/10* (2018.02)

(58) Field of Classification Search
CPC ..... H04W 36/30; H04W 36/08; H04W 36/24; H04W 36/26; H04W 36/245
See application file for complete search history.

(56) References Cited

U.S. PATENT DOCUMENTS

| 2015/0003420 | A1* | 1/2015 | Vangala | H04W 36/22 370/333 |
| 2017/0078905 | A1* | 3/2017 | Kasslin | H04W 48/20 |
| 2018/0048691 | A1* | 2/2018 | Pruden | H04L 47/2433 |

* cited by examiner

*Primary Examiner* — Omoniyi Obayanju
(74) *Attorney, Agent, or Firm* — Cooley LLP

(57) ABSTRACT

A non-transitory computer readable storage medium has instructions executed by a processor to access a list of Wi-Fi networks available to a user device. User network activity is classified. It is determined that there is a new Wi-Fi network for the user device to initiate a connection attempt. In the event of an existing licensed spectrum wireless network data connection on the user device, licensed spectrum wireless network data connection analytics are collected and an attempt is made to transition to the new Wi-Fi network to produce either a failed transition to the new Wi-Fi network or a successful transition to the new Wi-Fi network. In the event of an existing Wi-Fi network collection on the user device or a successful transition to the new Wi-Fi network, available Wi-Fi networks are periodically assessed to establish one of a network unavailable state and a network available state.

4 Claims, 2 Drawing Sheets

APPARATUS AND METHOD FOR STEERING WIRELESS NETWORK CONNECTIONS BASED UPON QUALITY ASSESSMENTS

FIELD OF THE INVENTION

This invention relates generally to user device wireless communications. More particularly, this invention is directed toward transitioning a user device to different wireless network connections based upon wireless network quality assessments.

BACKGROUND OF THE INVENTION

User devices, such as mobile computing devices, are used to establish wireless network connections with licensed spectrum wireless network service providers. The licensed spectrum wireless network service providers provision wireless voice connections and wireless data connections. The wireless data connections may be used to establish voice connections, such as through a Voice Over Internet Protocol (VoIP) connection, which may have limited bandwidth.

Therefore, there is an interest to have a user device access an unlicensed spectrum wireless network, such as a Wireless Fidelity or Wi-Fi network, because such connections are typically free. However, any given Wi-Fi connection may not meet the network activity needs of a user. Therefore, transition to such a network should not be haphazardly initiated.

In view of the foregoing, there is a need to steer wireless network connections based upon wireless network quality assessments.

SUMMARY OF THE INVENTION

A non-transitory computer readable storage medium has instructions executed by a processor to access a list of unlicensed spectrum wireless networks available to a user device. User network activity is classified to derive one of first network connectivity parameters to support voice over Internet Protocol (VoIP) activity, second network connectivity parameters to support data streaming activity and third network connectivity parameters to support periodic web page downloads. It is determined that there is a new unlicensed spectrum wireless network for the user device to initiate a connection attempt. In the event of an existing licensed spectrum wireless network data connection on the user device, licensed spectrum wireless network data connection analytics are collected and an attempt is made to transition to the new unlicensed spectrum wireless network to produce either a failed transition to the new unlicensed spectrum wireless network or a successful transition to the new unlicensed spectrum wireless network. In the event of an existing unlicensed spectrum wireless network collection on the user device or a successful transition to the new unlicensed spectrum wireless network, available unlicensed spectrum wireless networks are periodically assessed to establish one of a network unavailable state and a network available state. In the event of the network unavailable state, available unlicensed spectrum wireless networks are periodically assessed. In the event of the network available state, the operation to access the list of unlicensed spectrum wireless networks available to the user device and subsequent operations are repeated.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
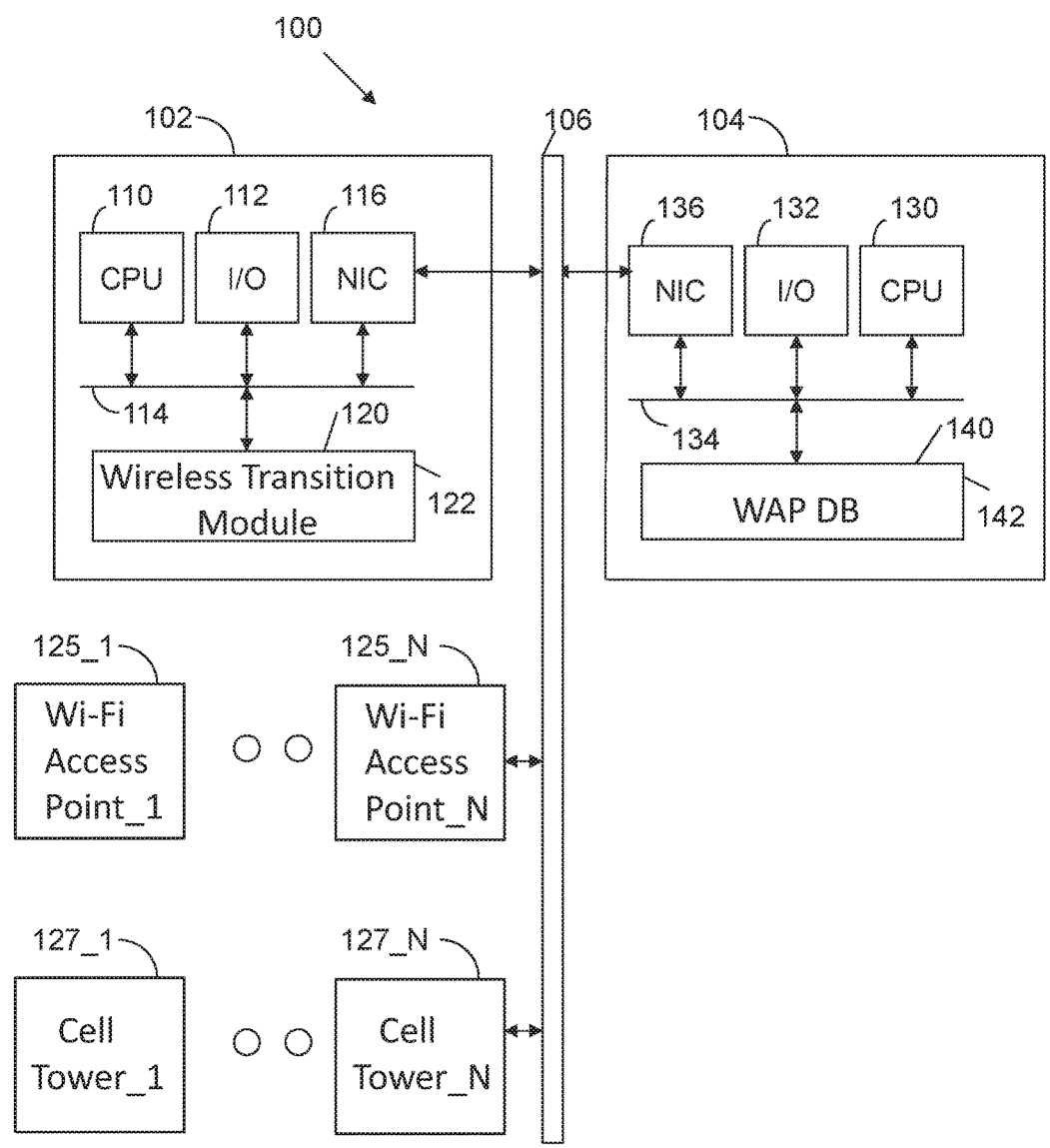
FIG. 1 illustrates a system configured in accordance with an embodiment of the invention.

FIG. 1 illustrates a system 100 configured in accordance with an embodiment of the invention. The system 100 includes a user device 102, such as a Smartphone, in communication with a wireless access point (WAP) resource server 104 via a network 106, which may be any combination of wired and wireless networks. The user device 102 includes a processor (e.g., central processing unit 110) in communication with input/output devices 112 via bus 114. The input/output devices may include a touch display, keypad and the like. A network interface circuit 116 is also connected to the bus 114 and provides connectivity to network 106. The network interface circuit 116 also communicates with available Wi-Fi Access Points 125_1 through 125_N. Further, the network interface circuit 116 communicates with cell towers 127_1 through 127_N to facilitate licensed spectrum wireless network voice connections and licensed spectrum wireless network data connections.

The client device 102 also includes a memory 120 connected to the bus 120. The memory 120 stores instructions executed by processor 110 to implement operations disclosed herein. In particular, the memory 120 stores a wireless transition module 122, which coordinates steering of a licensed spectrum wireless network data connection to an unlicensed spectrum wireless network, and vice versa. Similarly, the wireless transition module 122 coordinates steering of wireless network connections between unlicensed spectrum wireless networks.

The wireless transition module 122 includes instructions executed by the processor to periodically pass scan lists to the server 104. Each scan list includes information on Wi-Fi access points available to the client device at a particular time and location.

WAP resource server 104 includes standard components, such as a processor (e.g., CPU 130), input/output devices 132, bus 134 and network interface circuit 136. A memory 140) is connected to the bus 134. The memory stores a WAP database 142. The WAP database 142 is a repository of known WAPs and the attributes associated with the known WAPs. The WAP database 142 is built over time by collecting scan lists from client device 102 and through other network monitoring, testing, and probing operations. The client device 102 periodically requests a scan list from the WAP database 142. The scan list from the WAP database prioritizes for the client device the available Wi-Fi networks based upon ratings and analytics derived from the WAP database 142.

Figure 2:
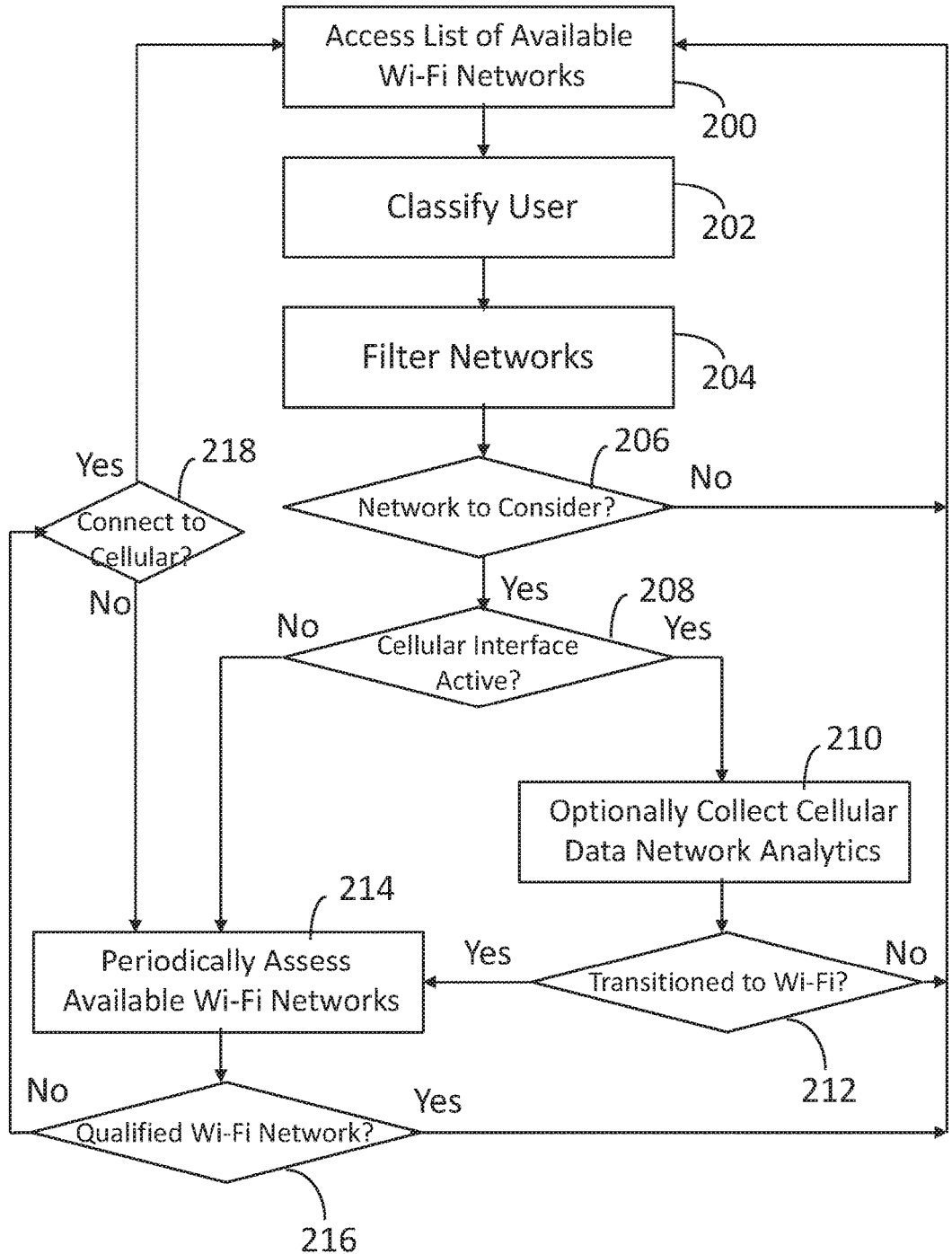
FIG. 2 illustrates processing operations associated with an embodiment of the invention.

FIG. 2 illustrates processing operations associated with an embodiment of the invention. More particularly, FIG. 2 illustrates operations performed by the wireless transition module 122. Initially, a list of available Wi-Fi networks is accessed. For example, the wireless transition module 122 accesses WAP database 142, which has information on Wi-Fi networks available (e.g., 125_1 through 125_N) to client device 102. The WAP database 142 also has information on the functional capabilities of the different Wi-Fi access points.

The next processing operation is to classify the user 202. The user is classified on any number of criteria. The criteria may be historical network activity attributes, current network activity attributes, user quality of service requirements and combinations thereof. In one embodiment, the user is classified to derive different network connectivity parameters. For example, first network connectivity parameters may be defined to support voice over Internet Protocol (VoIP) activity. In one embodiment, such parameters may specify a latency of 60 ms or less, a packet loss percentage of less than 0.1 and jitter of less than 100 ms. Second network connectivity parameters may be defined to support data streaming activity. In one embodiment, the second network connectivity parameters include a latency of less than 100 ms and a download speed of greater than 5 Mbs. Third network connectivity parameters may be defined to support periodic web page downloads. In one embodiment, the third network connectivity parameters include a latency of less than 75 ms, a download speed of greater than 3 Mbs and an upload speed of greater than 1 Mbs.

The list of available Wi-Fi networks is then filtered 204. In particular, the list is filtered based upon the classification of the user. That is, one of the first network connectivity parameters, the second network connectivity parameters and the third network connectivity parameters is used to identify available Wi-Fi networks that satisfy the connection requirements of the user. If the filtered list results in no networks to consider (206—No), control returns to block 200. If the filtered list results in networks to consider (206—Yes), it is determined whether the cellular data interface is active 208. In other words, at this point the user device 102 has visibility into available Wi-Fi access points and may also be actively in a wireless cellular data communication session. If the cellular interface is active (208—Yes), then cellular data network analytics are optionally collected 210. For example, machine learning techniques may be used to consider the environment, usage pattern and configuration to perform a quality check on the current network. If such, a check is desirable, quality of experience data is collected and stored for the cellular session.

An attempt is made to connect to the Wi-Fi network. The attempt may include a quality check of the Wi-Fi network. In one embodiment, the Wi-Fi quality of experience must exceed a required throughput threshold. Wi-Fi network testing may be performed to confirm that the Wi-Fi network is currently performing in accordance with the network connectivity parameters that are required for the user. If such conditions are met, the primary network interface is switched from cellular data to Wi-Fi.

If the connection is not successful (212—No), the cellular data interface remains active and control returns to block 200. The list of available Wi-Fi networks may be accessed after some configured delay after a previous access of the list of available Wi-Fi networks.

In the event that the cellular interface is not active (208—No) and after transitioning from cellular data to Wi-Fi (212—Yes), available Wi-Fi networks are periodically assessed 214. If there are no qualified networks (216—No), it is determined whether to connect to cellular 218. In other words, at this point there may be no new qualified Wi-Fi network available and the existing Wi-Fi network may no longer support a wireless session, in which case a connection to cellular is required (218—Yes) and control returns to block 200. If a connection to cellular is not required (218—No) because the existing Wi-Fi connection is adequate, then control returns to block 214. If there are qualified Wi-Fi networks (216—Yes), control returns to block 200.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices: magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
    (a) access a list of unlicensed spectrum wireless networks available to a user device;
    (b) classify user network activity to alternately derive each of first network connectivity parameters to support voice over Internet Protocol (VoIP) activity, second network connectivity parameters to support data streaming activity and third network connectivity parameters to support periodic web page downloads;
    (c) determine that there is a new unlicensed spectrum wireless network for the user device to initiate a connection attempt;
    (d) in the event of an existing licensed spectrum wireless network data connection on the user device, collecting licensed spectrum wireless network data connection analytics and attempting to transition to the new unlicensed spectrum wireless network to produce either a failed transition to the new unlicensed spectrum wireless network or a successful transition to the new unlicensed spectrum wireless network;

(e) in the event of an existing unlicensed spectrum wireless network collection on the user device or a successful transition to the new unlicensed spectrum wireless network, periodically assessing available unlicensed spectrum wireless networks to establish one of a network unavailable state and a network available state; and (f) in the event of the network unavailable state, return to operation (e) and in the event of the network available state, return to operation (a);

wherein the instructions executed by the processor to determine that there is a new unlicensed spectrum wireless network include instructions executed by the processor to alternately use each of the first network connectivity parameters, the second network connectivity parameters and the third network connectivity parameters to filter the list of unlicensed spectrum wireless networks available to the user device to identify the new unlicensed spectrum wireless network.

2. The non-transitory computer readable storage medium of claim 1 wherein the first network connectivity parameters include a specified latency, a specified packet loss percentage and a specified jitter.

3. The non-transitory computer readable storage medium of claim 1 wherein the second network connectivity parameters include a specified latency and a specified download speed.

4. The non-transitory computer readable storage medium of claim 1 wherein the third network connectivity parameters include a specified latency, a specified download speed and a specified upload speed.

* * * * *